(12) United States Patent
Garcia (10) Patent No.: US 7,963,530 B1
(45) Date of Patent: Jun. 21, 2011

(54) BEACH WAGON

(76) Inventor: Oscar Garcia, Braintree, MA (US)

( * ) Notice: Subject to any disclaimer, the term of this patent is extended or adjusted under 35 U.S.C. 154(b) by 0 days.

(21) Appl. No.: 12/427,182

(22) Filed: Apr. 21, 2009

(51) Int. Cl.
*B62B 1/00* (2006.01)

(52) U.S. Cl. .................... 280/30; 280/47.26; 280/47.18; 280/28; 280/8

(58) Field of Classification Search ...................... 280/30
See application file for complete search history.

(56) References Cited

U.S. PATENT DOCUMENTS

| | | |
|---|---|---|
| 4,863,075 A | 9/1989 | Romer |
| 5,222,748 A * | 6/1993 | Johnson ............................ 280/8 |
| 5,620,191 A | 4/1997 | Sayette |
| D396,023 S | 7/1998 | Mello |
| 5,857,695 A | 1/1999 | Crowell |
| 5,876,047 A | 3/1999 | Dennis |
| 5,911,422 A | 6/1999 | Carpenter et al. |
| 6,446,981 B1 | 9/2002 | Wise et al. |
| 6,533,298 B2 | 3/2003 | Sims |
| 6,648,349 B1 * | 11/2003 | Waller et al. ............... 280/47.35 |

* cited by examiner

*Primary Examiner* — Tony H. Winner
*Assistant Examiner* — Jacob Knutson
(74) *Attorney, Agent, or Firm* — Kyle Fletcher (57) ABSTRACT

The beach wagon is a modified wagon including a plurality of large wheels, a plurality of foldable chair carrying racks, and side bars that can carry umbrellas, tables, and the like. The beach wagon is also capable of storing items inside of the wagon bed, such as coolers and beach toys.

5 Claims, 8 Drawing Sheets

BEACH WAGON

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable.

BACKGROUND OF THE INVENTION

A. Field of the Invention

The present invention relates to the field of manually-drive wagons, more specifically, a wagon designed to carry a plurality of foldable chairs and other items needed for visiting a beach.

B. Discussion of the Prior Art

As a preliminary note, it should be stated that there is an ample amount of prior art that deals with hand drawn wagons. As will be discussed immediately below, no prior art discloses a wagon specifically designed for use with the beach that is capable of carrying a plurality of foldable chairs along with a plurality of other items frequently used on a beach.

The Crowell Patent (U.S. Pat. No. 5,857,695) discloses a collapsible beach cart that includes a removable storage bag. However, the beach cart does not have a plurality of extensions that extend up from the bed of the cart to support a plurality of foldable chairs.

The Carpenter et al. Patent (U.S. Pat. No. 5,911,422) discloses a wheeled carrier that is suitable for carrying diverse articles on sandy terrain and having a rack suitable for holding folding chairs. However, the rack does not extend from the bed of the wagon and hold a plurality of foldable chairs.

The Sims Patent (U.S. Pat. No. 6,533,298) discloses a beach carrying device for transporting items over hard surfaces and soft surfaces. However, the device does not resemble a wagon having four large wheels suitable for driving upon hard and soft surfaces.

The Dennis Patent (U.S. Patent No. 5,876,047) discloses a utility cart with removable chair supports. However, the utility cart does not have an open bed but is rather consumed by an ice chest.

The Sayette Patent (U.S. Pat. No. 5,620,191) discloses a multiple purpose sled for carrying a plurality of objects, such as beach equipment, over varied terrain. However, the multiple purpose sled does not resemble a wagon having a plurality of carrying racks capable of carrying a plurality of foldable chairs along with other objects typically used in a beach outing.

The Johnson Patent (U.S. Pat. No. 5,222,748) discloses a beach tote sled, which does not resemble a wagon.

The Romer Patent (U.S. Pat. No. 4,863,075) discloses a beach caddy that is used for transporting and storing items for recreational use at the beach. However, the cart does not have a plurality of carrying racks extending vertically in support of a plurality of foldable chairs.

The Wise et al. Patent (U.S. Pat. No. 6,446,981) discloses a cart with a convertible cover/table which includes a cooler compartment. However, the cart does not have a plurality of carrying racks capable of storing or carrying a plurality of foldable chairs.

The Waller et al. Patent (U.S. Pat. No. 6,648,349) discloses a multi-purpose cart that allows the user to store and safely transport a plurality of items, including a beach umbrella. However, the cart does not provide a plurality of carrying racks that can each carry a plurality of foldable chairs.

While the above-described devices fulfill their respective and particular objects and requirements, they do not describe a beach wagon that has a plurality of carrying racks that extend from the bed of the wagon and of which each carries a plurality of foldable chairs along with side bars that can carry umbrellas and other similarly shaped objects. In this regard, the beach wagon departs from the conventional concepts and designs of the prior art.

SUMMARY OF THE INVENTION

The beach wagon is a modified wagon including a plurality of large wheels, a plurality of foldable chair carrying racks, and side bars that can carry umbrellas, tables, and the like. The beach wagon is also capable of storing items inside of the wagon bed, such as coolers and beach toys. The beach wagon can also support a tabletop and umbrella for use as a picnic table.

An object of the invention is to provide a beach wagon that can store and carry a plurality of foldable chairs.

A further object of the invention is to provide a beach wagon that can easily be driven across hard and soft surfaces via the large wheels.

A further object of the invention is to provide a beach wagon that can store and carry an umbrella, table, cooler, and other beach needs.

A further object of the invention is to provide a beach wagon that can double as a picnic table with or without an umbrella for providing shade when used as such.

These together with additional objects, features and advantages of the beach wagon will be readily apparent to those of ordinary skill in the art upon reading the following detailed description of presently preferred, but nonetheless illustrative, embodiments of the beach wagon when taken in conjunction with the accompanying drawings.

In this respect, before explaining the current embodiments of the beach wagon in detail, it is to be understood that the beach wagon is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the beach wagon. It is therefore important that the claims be regarded as including such equivalent construction insofar as they do not depart from the spirit and scope of the beach wagon. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Detailed reference will now be made to the preferred embodiment of the present invention, examples of which are illustrated in FIGS. 1-8. A beach wagon 10 (hereinafter invention) includes a wagon 11, a plurality of carrying racks 12, and a plurality of side bars 13.

The wagon 11 resembles a traditional wagon with a few exceptions. The wagon 11 is outfitted with a plurality of large wheels 11A that are ideal for driving across either hard or soft surfaces. The wagon 11 has a plurality of mounts 14 that are attached to the wagon bed 11B. The wagon 11 also has side walls 11C that extend up from the wagon bed 11B. The side walls 11C are removable.

The mounts 14 support the carrying racks 12 to the wagon 11. The carrying racks 12 can be removed from the mounts 14 by simply raising the carrying racks 12 from the respective mounts 14. The mounts 14 are simply piping with a bottom end closed off to support the carrying racks 12. The carrying racks 12 have an extending arm 12A that can support a plurality of foldable chairs 30. The mounts 14 are also capable of holding an umbrella 16 upright (see FIG. 8) when the carrying rack 12 is not being supported.

The side bars 13 attach to the outer sides of the wagon 11. Eyelets 11D attach to the sides of the wagon 11 below the side bars 13. The side bars 13 are ideal for supporting a plurality of items, such as tables, tents 17, and collapsed umbrellas 16. Said items are secured via a strap that attaches to the eyelets 11D, wraps over said item as well as the respective side bar 13, and ties on to the respective side wall 11C.

The wagon 11, carrying racks 12, and side bars 13 shall be made of a material comprising a wood, metal, or plastic. The wheels 11A shall be made of a material comprising a rubber, plastic, or metal.

It is envisioned that the invention 10 is apply used to support and carry beach towels, beach toys, coolers, tables, tents, umbrellas, beach bags, a plurality of foldable chairs, etc.

Figure 1:
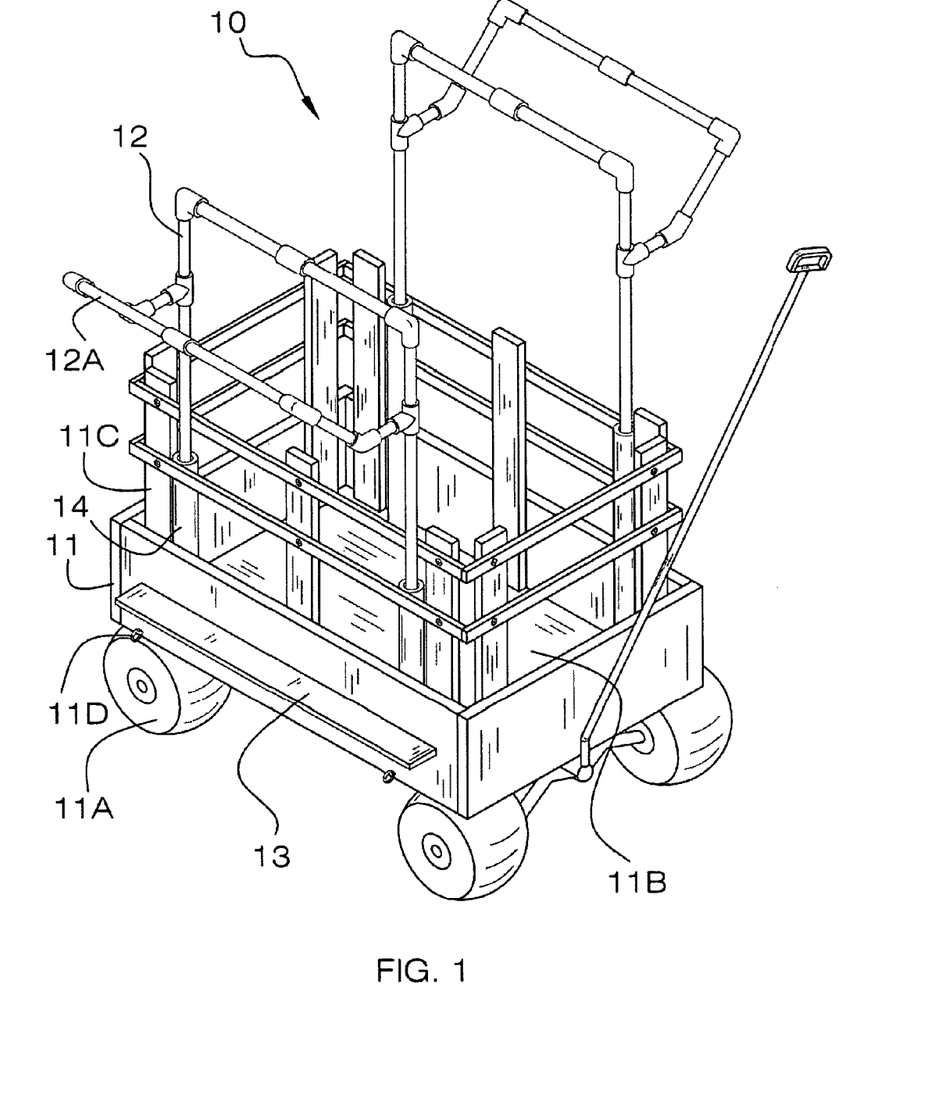
FIG. 1 illustrates an isometric view of the invention with the side bars attached and plurality of carrying racks in place.
Figure 2:
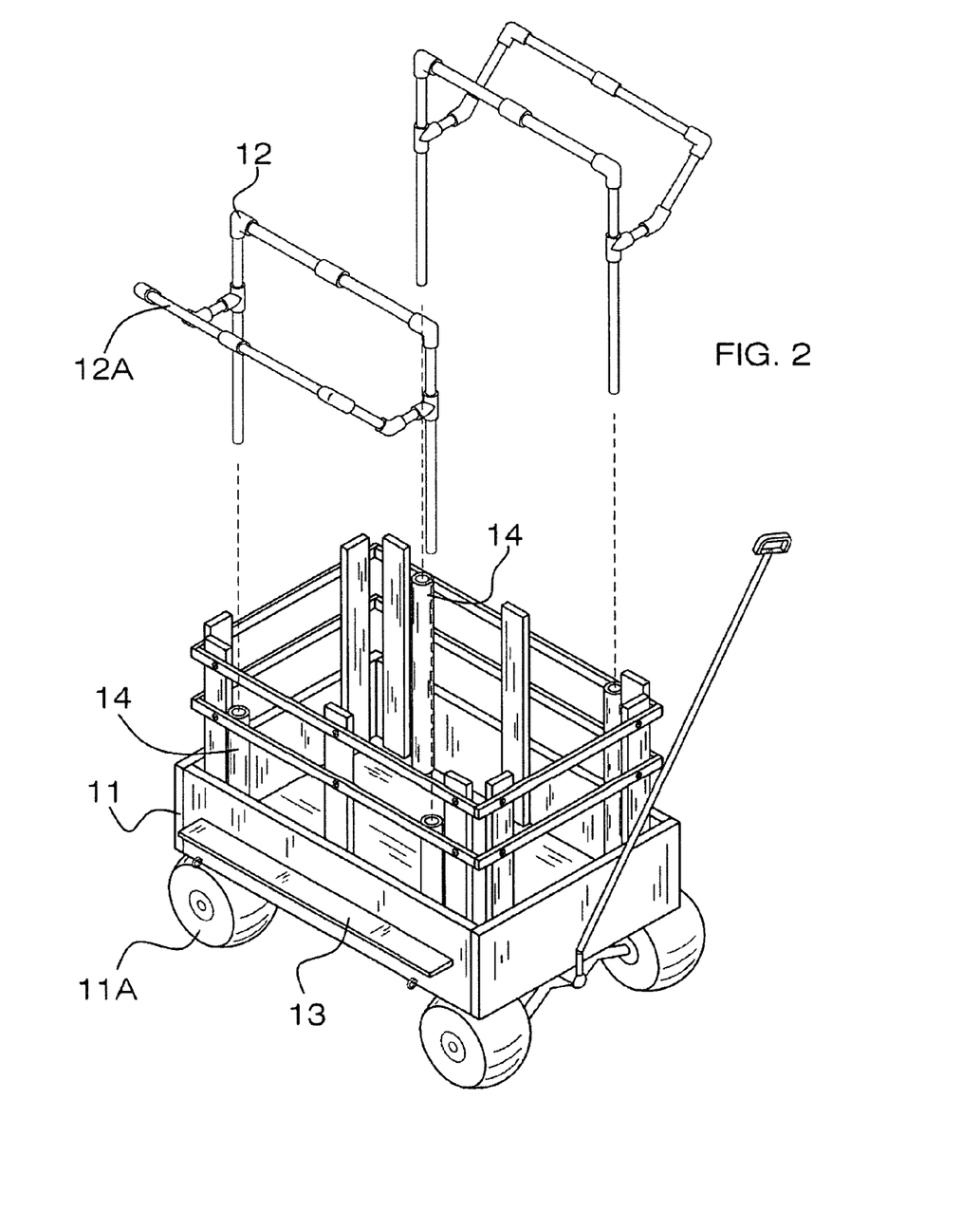
FIG. 2 illustrates an isometric view of the invention and carrying racks separated with dashed lines indicating alignment of the carrying racks to the beach wagon.
Figure 3:
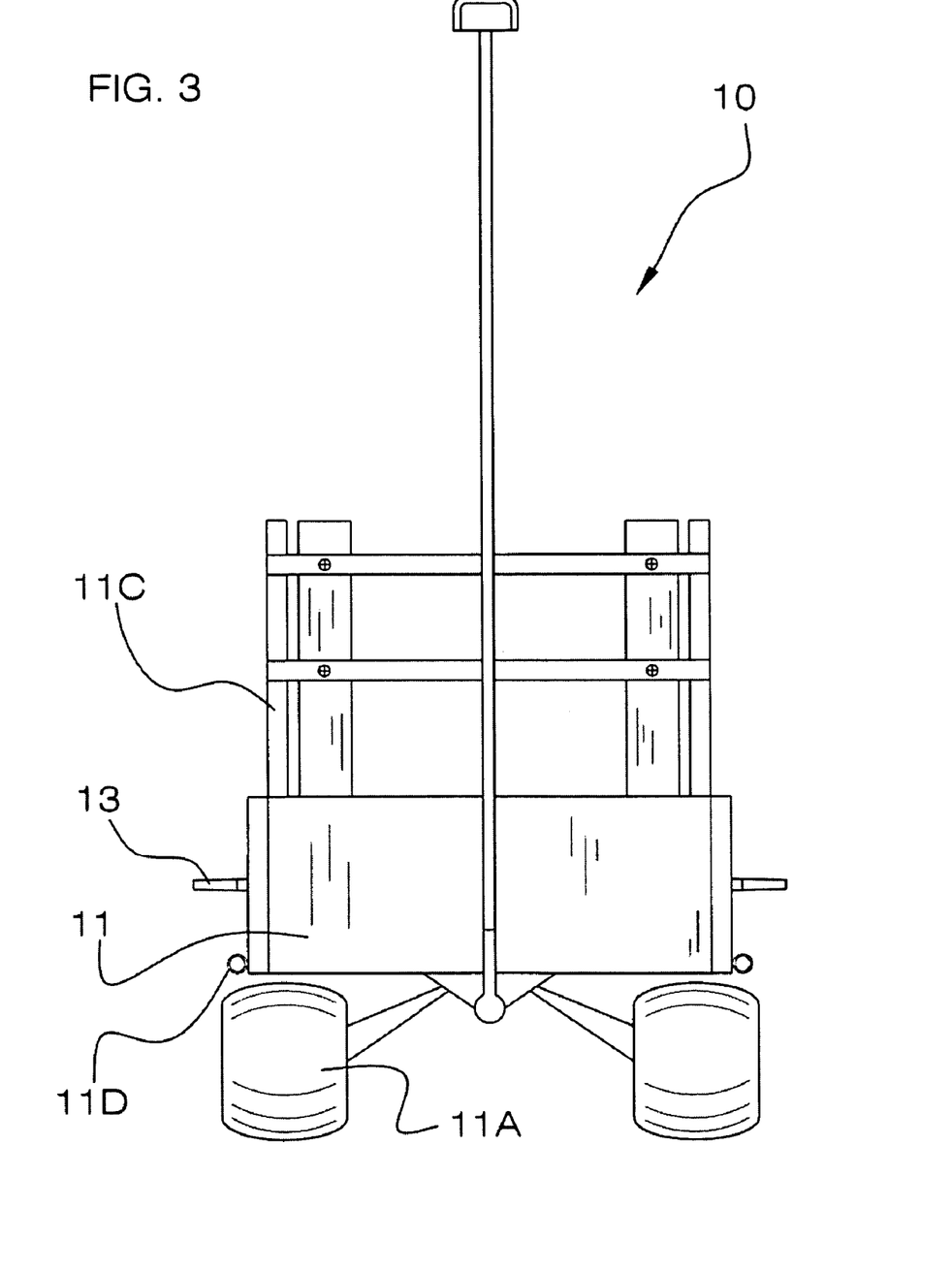
FIG. 3 illustrates a front view of the beach wagon with the carrying racks removed.
Figure 4:
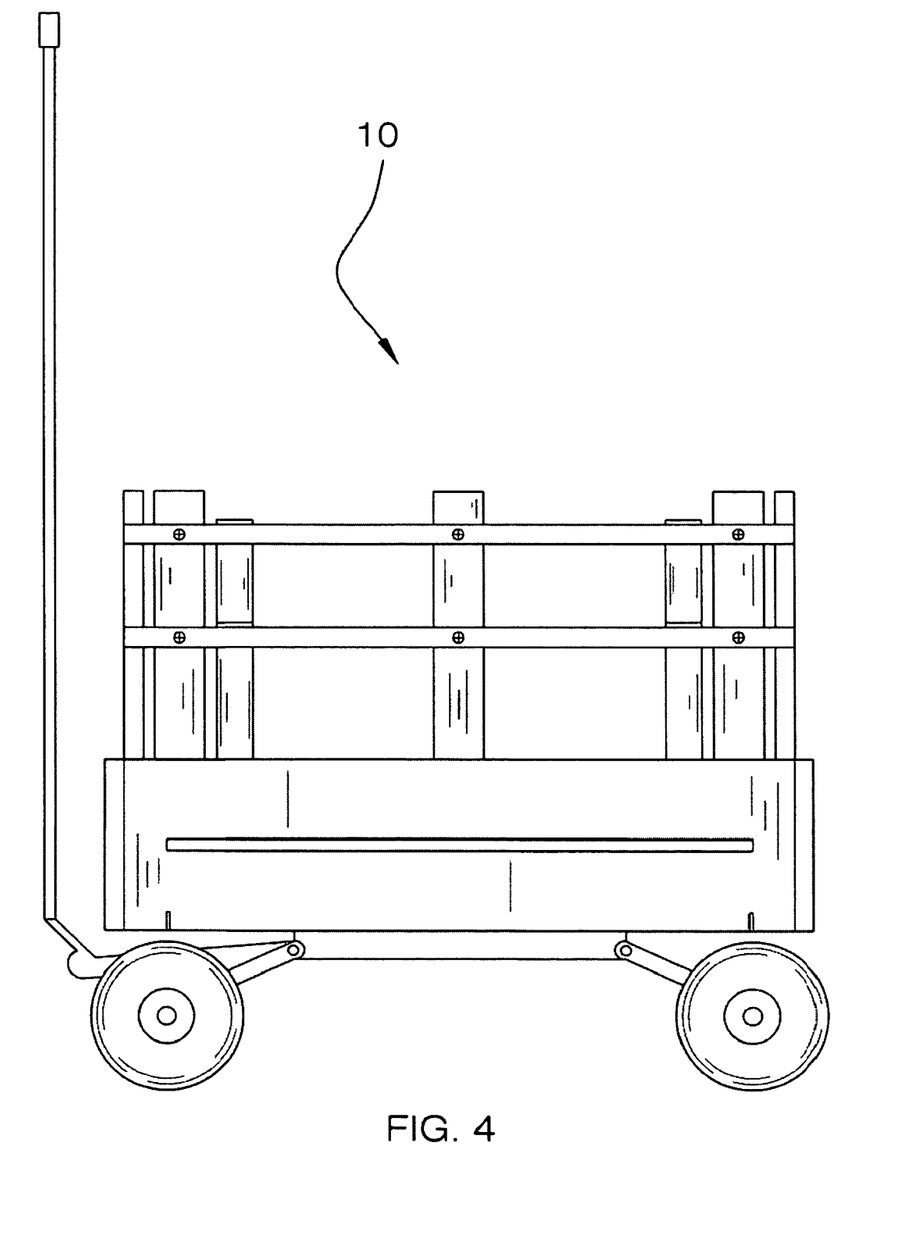
FIG. 4 illustrates a side view of the beach wagon with the carrying racks removed.
Figure 5:
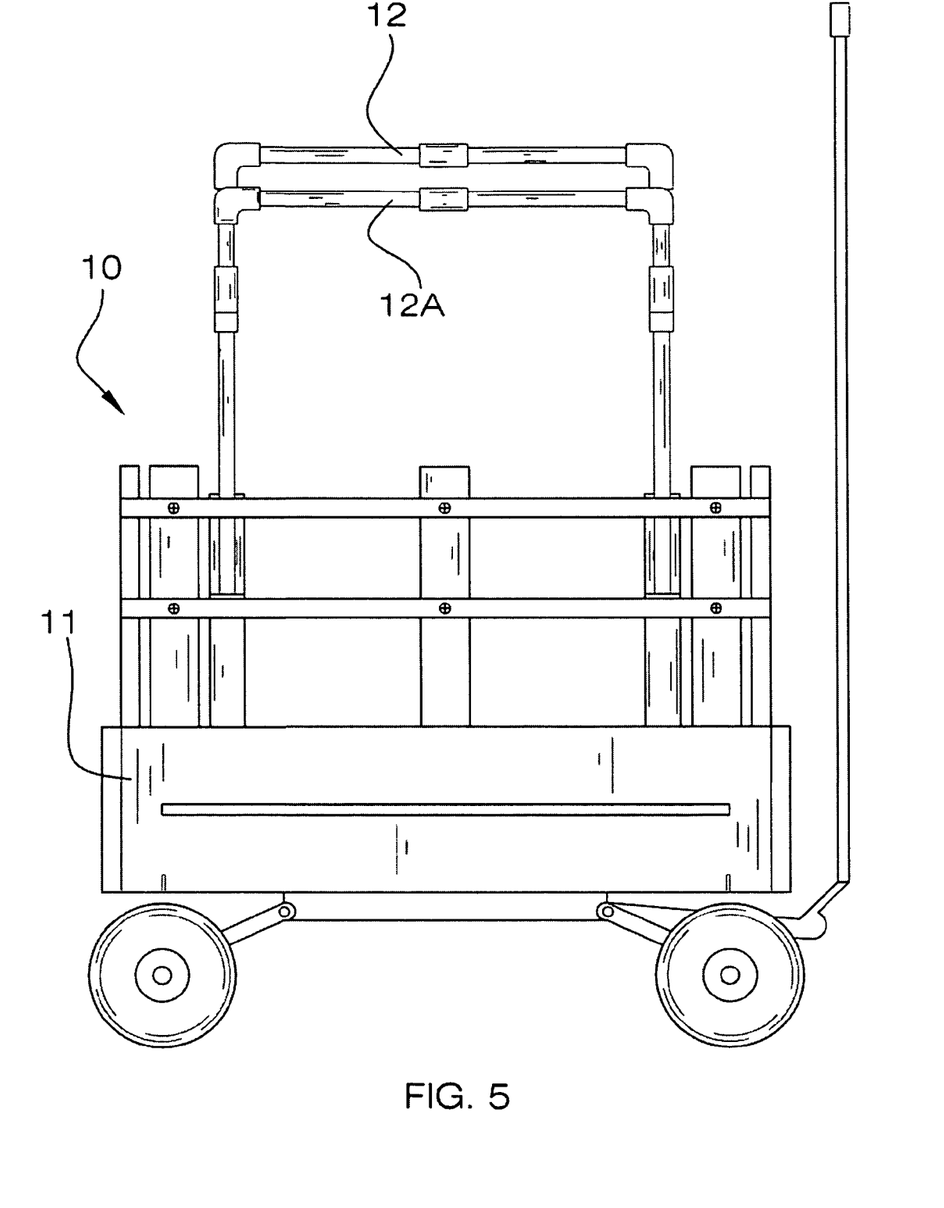
FIG. 5 illustrates a side view of the beach wagon with the carrying racks installed.
Figure 6:
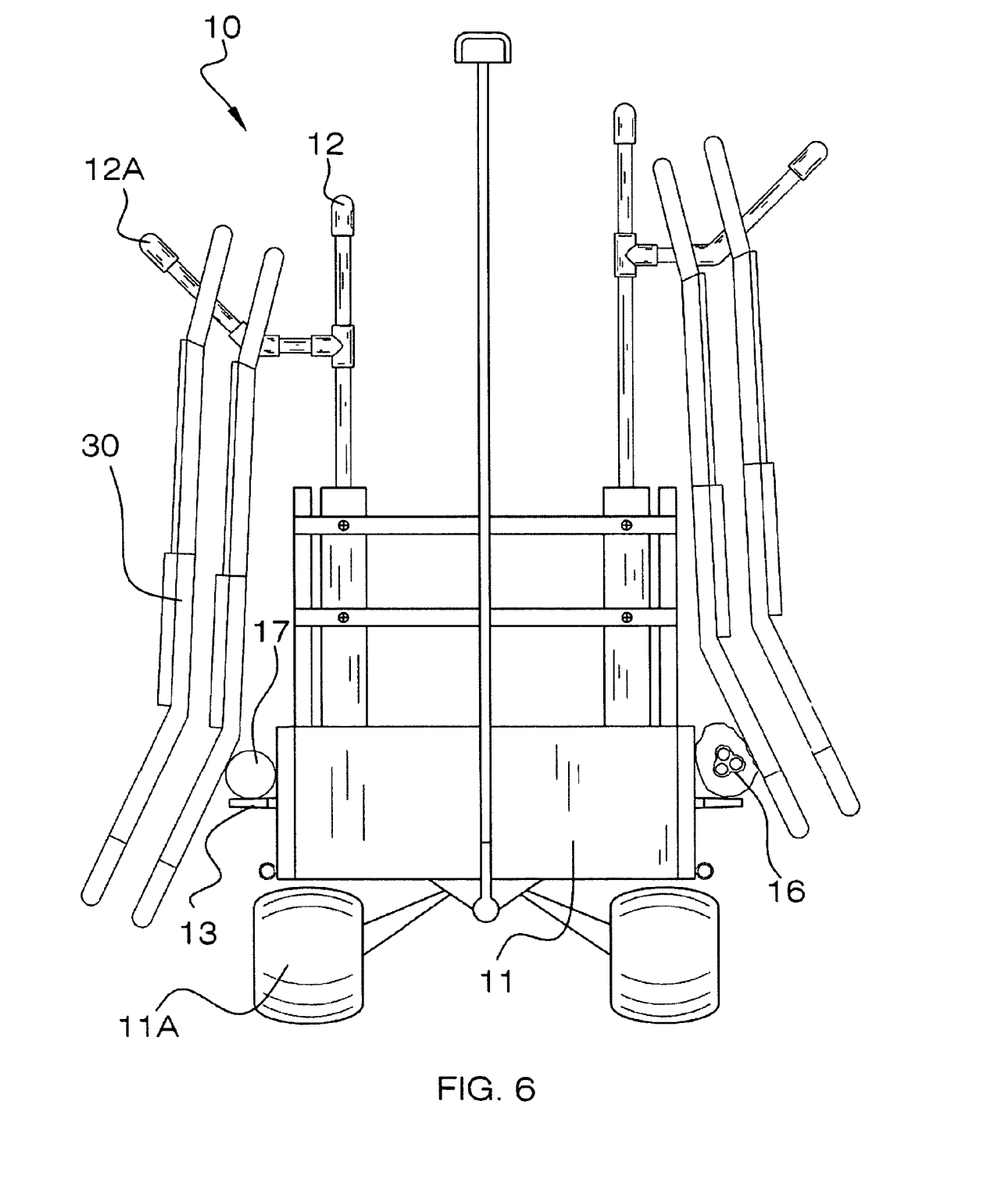
FIG. 6 illustrates a front view of the beach wagon with the carrying racks installed.
Figure 7:
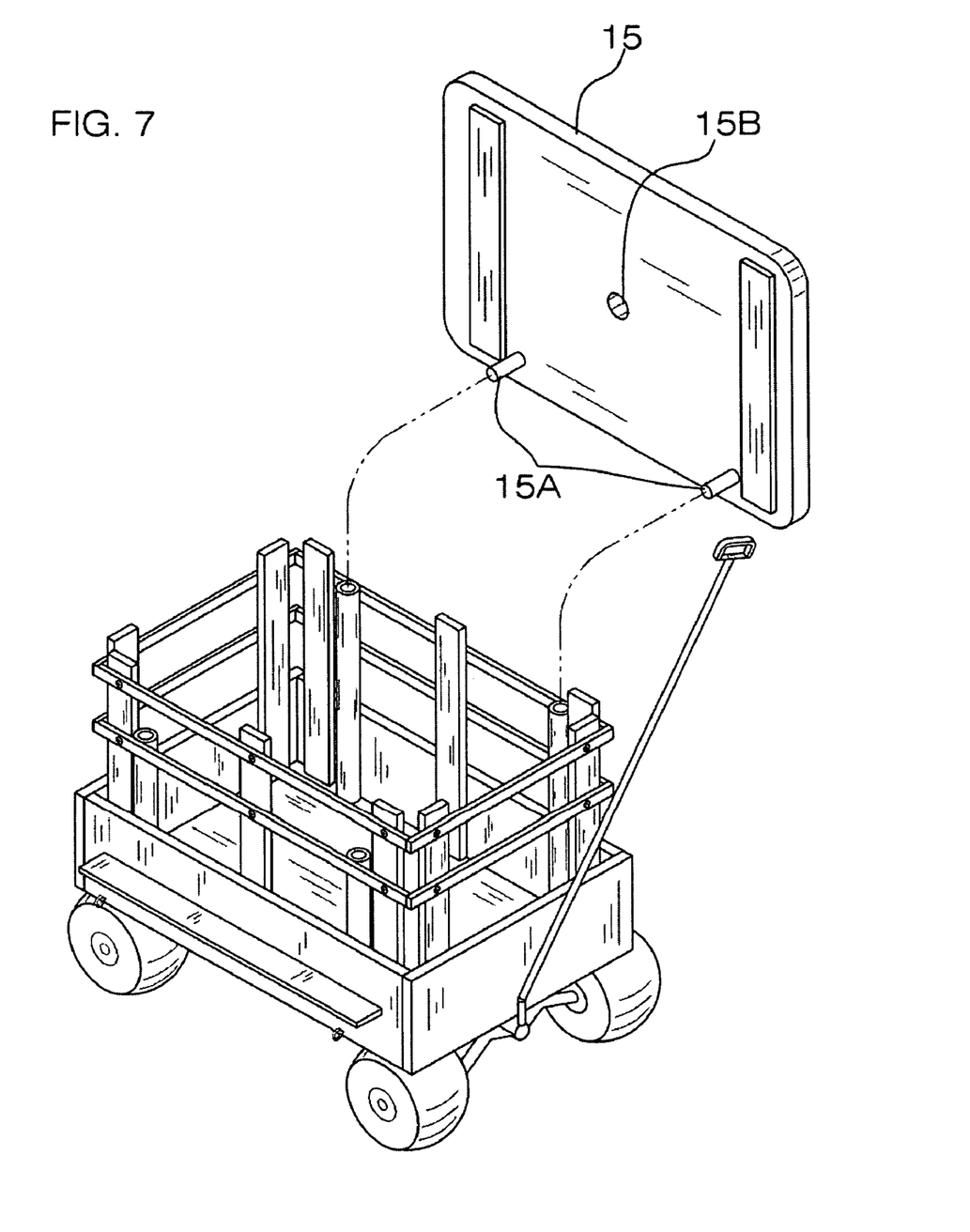
FIG. 7 illustrates an isometric view of the beach wagon and detailing installation of a tabletop.
Figure 8:
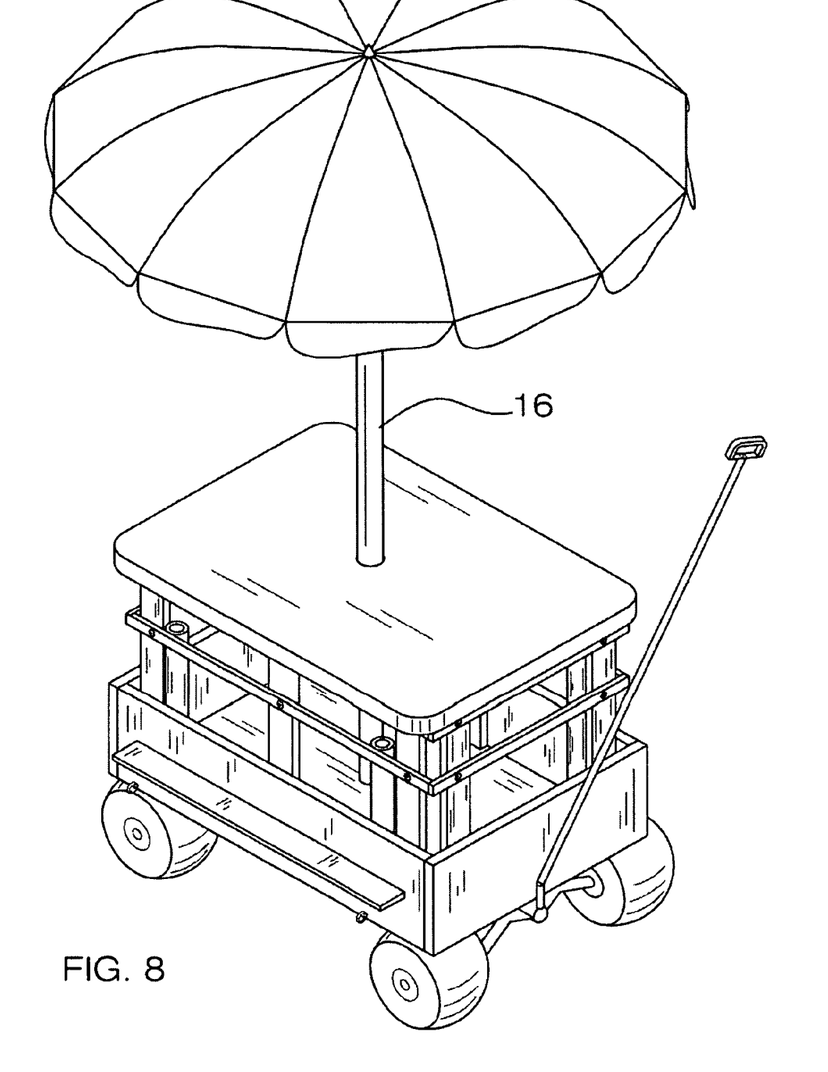
FIG. 8 illustrates an isometric view of the beach wagon with the tabletop installed with an umbrella extended.

Referring to FIGS. 7 and 8, the invention 10 can double as a remote picnic table by installing a table 15 onto the mounts 14 via table pins 15A that are inserted into said mounts 14. The umbrella 16 can be inserted into a hole 15B in the table 15 to provide shade for the picnic table function of the invention 10.

With respect to the above description, it is to be realized that the optimum dimensional relationship for the various components of the invention 10, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 10.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A wagon for use in storing and carrying a plurality of items onto a beach comprising:
    (a) the wagon;
        wherein the wagon has a plurality of large wheels that are suitable for rolling across either hard or soft surfaces;
        wherein the wagon has a bed and side walls for supporting items inside of the bed of the wagon;
        wherein the side walls are removable;
    (b) a plurality of side bars;
        wherein the side bars mount along the sides of the wagon, and are removable;
        wherein the side bars are capable of supporting items via securing means;
        wherein the securing means comprise a strap that attaches to an eyelet mounted below the side bar, and to the side wall above the side bar;
    (c) a plurality of carrying racks;
        wherein the carrying racks attach to mounts located in the bed of the wagon;
        wherein the mounts can also be used as an umbrella stand when not used by a carrying rack;
        wherein the mounts can also be used to support a table in order to convert the wagon into a picnic table;
        wherein the table has a hole for supporting an umbrella;
        wherein the carrying racks each are capable of carrying a plurality of foldable chairs;
        wherein the carrying racks are removable from the mounts.

2. The wagon as described in claim 1 wherein the carrying racks are made of a material comprising a metal, wood, or plastic.

3. The wagon as described in claim 1 wherein the side bars are made of a material comprising a metal, wood, or plastic.

4. The wagon as described in claim 1 wherein the large wheels are made of a material comprising a plastic, rubber, or metal.

5. The wagon as described in claim 1 wherein the wagon is made of a material comprising a metal, wood, or plastic.

* * * * *